United States Patent
Ozaki et al.

[11] Patent Number: 6,146,486
[45] Date of Patent: Nov. 14, 2000

[54] PREPARATION OF RESIN-COATED SUPPORT

[75] Inventors: Kazuo Ozaki; Tadahiro Kegasawa; Tetsuya Yoshida, all of Shizuoka, Japan

[73] Assignee: Fuji Photo Film Co., Ltd., Kanagawa, Japan

[21] Appl. No.: 09/217,901

[22] Filed: Dec. 22, 1998

[30] Foreign Application Priority Data

Dec. 22, 1997 [JP] Japan ................................ 9-366508

[51] Int. Cl.⁷ .............................. B32B 31/00; G03C 1/79
[52] U.S. Cl. .................... 156/244.11; 156/309.9; 156/324; 427/445
[58] Field of Search ............................ 156/244.11, 324, 156/308.2, 309.9; 427/445

[56] References Cited

FOREIGN PATENT DOCUMENTS 6-208197  7/1994  Japan .

*Primary Examiner*—Sam Chuan Yao
*Attorney, Agent, or Firm*—Sughrue, Mion, Zinn, Macpeak & Seas, PLLC

[57] ABSTRACT

A resin-coated support sheet favorably employable as a support sheet of image recording material is prepared by the steps of mixing and kneading a polyolefin resin with titanium dioxide under heating to obtain a kneaded mixture, cooling the kneaded mixture, treating the cooled mixture to give pellets, mixing and kneading the pellets with a polyolefin resin under heating to give a diluted mixture, extruding the diluted mixture through a slit of an extruder die, and coating the extruded mixture on a support sheet, wherein the step for giving the diluted mixture starts within 30 minutes after the kneaded mixture is obtained.

6 Claims, 2 Drawing Sheets

PREPARATION OF RESIN-COATED SUPPORT

FIELD OF THE INVENTION

This invention relates to a process for preparing a resin-coated support favorably employable as a support sheet of image recording material. In particular, the invention relates to a resin-coated support, sheet having a titanium dioxide-containing polyolefin resin layer on its surface which is favorably employable as a support sheet of photographic paper or image recording paper, the latter being employable with various printing systems such as a sublimation printer and a thermal transfer printer.

BACKGROUND OF THE INVENTION

A support sheet of known photographic paper generally has a multi-layered structure in which a polyolefin (usually, polyethylene) resin layer containing titanium dioxide (often referred to as "titanium dioxide-containing polyolefin resin layer") is provided on one surface of paper sheet, and another polyolefin resin layer containing no titanium dioxide is provided on the other surface. On the surface provided with the titanium dioxide-containing polyolefin resin layer, a photographic emulsion layer is formed to prepare a photographic paper. Since the resin-coated support sheet having such structure gives an image of high quality, it is also used as a support sheet of image recording paper to be used in combination with various printers such as a sublimation printer and a thermal transfer printer.

The polyolefin resin layer containing titanium dioxide (titanium dioxide-containing polyolefin resin layer) is usually formed in the following manner. Titanium dioxide and a portion of a polyolefin resin are mixed and kneaded under heating by means of a mixer or kneader (e.g., Banbury mixer) so that the resulting mixture can contain titanium dioxide at a high concentration. The mixture was then cooled, dried and treated to give polyolefin resin pellets (that is, master pellets) containing titanium dioxide in a high concentration. Thus prepared master pellets and another portion of a polyolefin resin (which generally is the same as the resin in the master pellets) are introduced into an extruder so that the resulting mixture can contain titanium dioxide in a predetermined concentration, and mixed and kneaded under heating. The kneaded mixture is supplied to a slit die (i.e., a die having a slit for extrusion of a resinous mixture), and extruded through the slit to give a resin film. Onto a paper sheet, the resin film is coated and cooled to give a support sheet having a titanium dioxide-containing polyolefin resin layer on its surface.

The process described above is generally referred to as "master batch method", and is widely used for preparing a resin-coated support sheet of photographic paper because the concentration of titanium dioxide can be easily controlled. On thus prepared resin-coated support sheet, a photographic emulsion layer is placed to give photographic paper.

A photographic image formed on the photographic paper is desired to have improved sharpness, and hence various studies on the support sheet have been reported. For example, Japanese Patent Provisional Publication No. 62(1987)-125345 reports that the image sharpness can be improved by increasing the concentration of titanium dioxide in the polyolefin resin layer of the resin-coated support sheet of photographic paper (its concentration is preferred to be in the range of 9 to 20 wt. %). This publication further reports that a high concentration of titanium dioxide often causes microgrit and/or die lip stain to decrease the quality of products, and further it lowers the productivity of the resin-coated support sheet. The word "microgrit" here means fine foreign material appearing on the surface of the titanium dioxide-containing polyolefin resin layer, and the word "die lip stain" means needle-like piece or stain produced at the end of the die lip after the kneaded mixture is extruded from the slit die.

In the description of the publication, therefore, titanium dioxide is used in a relatively low concentration so as not to cause microgrit and die lip stain, and the resin is used in the form of powder to give photographic paper giving improved sharpness. Since the resin is usually prepared in the form of pellets, the pellets must be beforehand pulverized to give the powder for the use in the process of the above-mentioned publication. The step for pulverizing the pellets, however, extremely lowers the productivity, and further causes unfavorable phenomena such as production of die lip stain if titanium dioxide is used in a relatively high concentration.

Japanese Patent Provisional Publication No. 9(1997)-50093 describes the following. In the case where a polyolefin resin containing titanium dioxide in a concentration of not less than 20 wt. % is extruded from a die lip at a temperature of 290 to 350° C. to give a resin layer, cracks and lines (carved by wastes attached to the end of the die lip) are liable to appear on the surface of the formed layer. The publication describes that such troubles are induced by water attached to (or combined with) the surface of the titanium dioxide particles. Therefore, in order to avoid the troubles, the publication proposes that the titanium dioxide be beforehand treated with a silane coupling agent. However, since the treatment with a silane coupling agent requires complicated process, it is very disadvantageous from the viewpoint of productivity to use titanium dioxide having a surface beforehand subjected to hydrophobic treatment such as the treatment using a silane coupling agent.

SUMMARY OF THE INVENTION

It is an object of the present invention to provide a process for preparing a resin-coated support sheet which is favorably employable for producing an image recording material and which has a polyolefin resin layer containing titanium dioxide in a high concentration. In particular, the object of the invention is to provide a process for preparing, in a high productivity, a resin-coated support sheet which is favorably employable as a support sheet of image recording material, and which has a polyolefin resin layer containing a high concentration of titanium dioxide possibly having a surface not beforehand treated to give a hydrophobic surface.

The inventors had studied for the purpose of establishing a method by which a polyolefin resin layer containing titanium dioxide in a high concentration can be formed without producing cracks and lines even in the case that the titanium dioxide is not beforehand treated with a silane coupling agent. In particular, the inventors made study on the content of water contained in master pellets (which contain titanium dioxide in a high concentration), and finally found the fact that the water content in master pellets increases as time passes. Further, it was also confirmed that cracks and lines do not appear on the polyolefin resin layer formed from freshly prepared master pellets. According to further study of the inventors, it was found that the above-mentioned troubles can be avoided by forming the resin layer as soon as the resin-titanium dioxide mixture is obtained and the master pellets are prepared.

Accordingly, the invention resides in a process for preparing a resin-coated support sheet which comprises the steps of mixing and kneading a polyolefin resin with titanium dioxide under heating to obtain a kneaded mixture, cooling the kneaded mixture, treating the cooled mixture to give pellets, mixing and kneading the pellets with a polyolefin resin under heating to give a diluted mixture, extruding the diluted mixture through a slit of an extruder die, and coating the extruded mixture on a support sheet, wherein the step for giving the diluted mixture starts within 30 minutes, preferably 25 minutes, more preferably within 15 minutes, after the kneaded mixture is obtained.

DETAILED DESCRIPTION OF THE INVENTION

Figure 1:
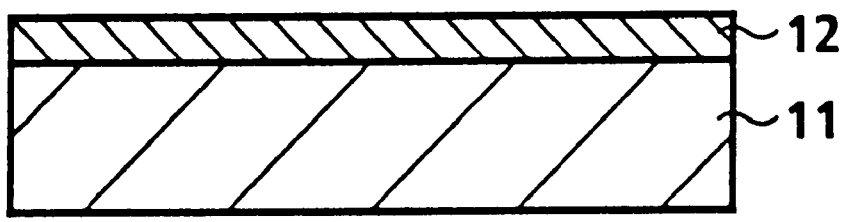
FIG. 1 shows a schematic sectional view of a typical example of the resin-coated support sheet prepared by the process of the invention.

The resin-coated support sheet prepared by the invention has a basic structure in which a titanium dioxide-containing polyolefin resin layer is coated on at least one surface of a support sheet such as a paper sheet. FIG. 1 shows a schematic sectional view of a typical example of the resin-coated support sheet for the use of producing an image recording material. In FIG. 1, a titanium dioxide-containing polyolefin resin layer 12 is coated on a support 11. The titanium dioxide-containing polyolefin resin layer may be a single layer or may comprise plural layers.

Figure 2:
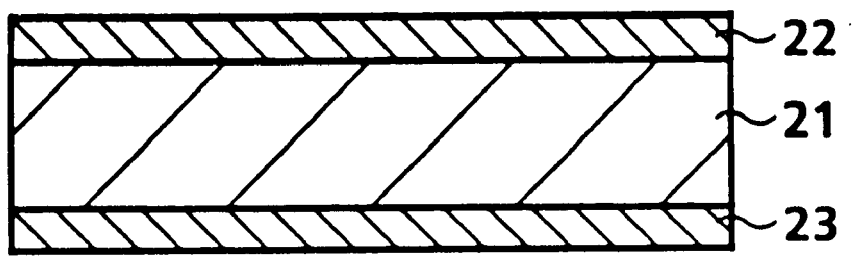
FIG. 2 shows a schematic sectional view of another typical example of the resin-coated support prepared by the process of the invention.

FIG. 2 shows a schematic sectional view of another typical example of the resin-coated support sheet for the use of producing an image recording material. In FIG. 2, a titanium dioxide-containing polyolefin resin layer 22 is coated on one surface of a support sheet 21. On the other surface of the support sheet 21, another polyolefin resin layer 23 containing no titanium dioxide is coated. The resin-coated support sheet having the structure shown in FIG. 2 is suitable for producing a photographic paper, which can be prepared by providing a photosensitive emulsion layer on the polyolefin resin layer 22.

As a support sheet for the use in the process of the invention, a sheet or film of any material can be employed, but generally sheets or films of various kinds of paper and thermoplastic resin are used. Examples of the papers include natural paper mainly comprising natural pulp, semi-synthetic paper comprising natural pulp and synthetic fiber, paper of synthetic fiber, and synthetic paper made from synthetic resin film (e.g., polystyrene film, polyethylene terephthalate film, and polypropylene film). Examples of the thermoplastic resins include polystyrene, polyethylene terephthalate, and polypropylene. A particularly preferred support is a sheet of natural paper (hereinafter, referred to as simply "paper sheet").

Into the paper sheet, various additives can be incorporated. Examples of the additives include alkylketene dimers for improving properties of the paper sheet; fillers (e.g., clay, talc, calcium carbonate, fine particles of urea resin); sizing agents (e.g., rosin, higher fatty acid, paraffin wax, alkeneylsuccinic acid); reinforcing agents (e.g., polyacrylamide); and fixers (e.g., aluminum sulfate). Other additives such as dyes, fluorescent dyes, slime controlling agents, and antifoaming agents are optionally employable.

Further, softening agents can be also incorporated into the paper sheet, if desired. With respect to the softening agents, a detailed description is given in "SHIN-KAMIKAKO BIN-RAN (new paper processing handbook)" edited by Shiyaku Times, pp. 554–555 (1980). In the softening agents seen there, compounds having a molecular weight of not more than 200 are preferably employed. The softening agents generally used are amine salts or quaternary ammonium salts which can self-fix on cellulose having a hydrophobic group consisting of not less than 10 carbon atoms.

Examples of the softening agents include a reaction product of a maleic anhydride copolymer and an alkylene polyamine, a reaction product of urethane alcohol and an alkylating agent, and a quaternary ammonium salt of a higher fatty acid. Particularly preferred are the reaction product of a maleic anhydride copolymer and an alkylene polyamine, and that of urethane alcohol and an alkylating agent.

The surface of the paper sheet may be subjected to surface sizing treatment with a film-forming polymer such as gelatin, starch, carboxymethyl cellulose, polyacrylamide, polyvinyl alcohol or modified polyvinyl alcohol. Examples of the modified polyvinyl alcohols include carboxyl group-modified polyvinyl alcohol, silanol-modified polyvinyl alcohol, and polyvinyl alcohol copolymerized with acrylamide. The film-forming polymers are coated on the paper sheet in an amount of preferably 0.1 to 5.0 $g/m^2$, more preferably 0.5 to 2.0 $g/m^2$. If desired, additives (e.g., antistatic agents, fluorescent whitening agents, pigments, and antifoaming agents) may be incorporated into the film-forming polymers.

The paper sheet is manufactured by the steps of: preparing a pulp slurry comprising pulp and, if desired, additives (e.g., fillers, sizing agents, reinforcing agents and fixers) in water; making paper from the aqueous slurry by means of a paper machine (e.g., Fourdrinier paper machine); drying and then winding up a paper sheet. In general, the surface sizing treatment is carried out before or after the drying step. Further, the paper sheet is generally subjected to calender treatment between the drying steps and the winding-up step. Although the calender treatment can be done before or after the surface sizing treatment, it is preferably carried out after all treatments are done if the surface sizing treatment is performed after the drying step. For the calender treatment, known rolls (e.g., metal roll, elastic roll) generally used for manufacturing paper sheets are employable.

By the calender treatment, the thickness of the paper sheet is adjusted to become in the range of 50 to 250 $\mu$m. The paper sheet preferably has a density of 0.8 to 1.3 $g/m^2$, more preferably 1.0 to 1.2 $g/m^2$.

As the polyolefin resins employable for the invention, resins of polyethylene and polypropylene are mentioned. Examples of the polyethylene resins include high density polyethylene (HDPE), low density polyethylene (LDPE), and linear low density polyethylene (L-LDPE). If the resulting resin-coated support should have a high rigidity, polypropylene resin, high density polyethylene (HDPE), or linear low density polyethylene (L-LDPE) is preferably used. These resins may be used singly or in combination.

In the case where the resin-coated support sheet is used for producing photographic paper, additives such as inorganic pigment, bluing agent and fluorescent whitening agent are preferably incorporated into at least one resin layer provided on the emulsion layer side of the paper sheet so as to improve the image quality. The resin layer (polyolefin resin layer) directly formed on the support sheet such as paper sheet may contain a tackifier or a tacky resin so as to increase the adhesion. Further, the resin layer may contain antioxidizing agents, releasing agents and hollow polymer particles.

The present invention is particularly effectively utilized in the case where the titanium dioxide has a surface not beforehand subjected to treatment for rendering its surface hydrophobic. The titanium dioxide employed for the invention may have an anatase structure or a rutile structure. For increasing the brightness of the resultant image, titanium dioxide of anatase type is preferably employed. On the other hand, if the sharpness is more required, titanium dioxide of rutile type is preferred. In consideration of both the brightness and the sharpness, titanium dioxides of both types may be mixed in the use. Further, two layers in which one contains the anatase type titanium dioxide and the other contains the rutile type titanium dioxide may be provided.

The titanium dioxide preferably has a mean particle size of 0.1 to 0.4 μm. If the size is less than 0.1 μm, the particles are hardly dispersed homogeneously in the resin layer. If the size is above 0.4 μm, the resultant image can not have sufficient brightness, and further protrusions are often formed on the coated surface to lower the image quality.

Although the surface of the titanium dioxide used for the invention does not need to be beforehand subjected to hydrophobic treatment such as silane-coupling treatment, surface treatment using inorganic material is preferably beforehand carried out in order to reduce the activity of the titanium dioxide. As the agents for the treatment, $Al_2O_3$ and $SiO_2$ are generally used singly or in combination. The agent for the surface treatment is preferably used in an amount of 0.01 to 1.8 wt. % (more preferably 0.02 to 1.0 wt. %, in terms of its anhydride) based on the amount of the titanium dioxide. In combination with the agents, a solvent such as triethanolethane is generally used. Titanium dioxide not subjected to the surface treatment with the inorganic material sometimes shows poor heat resistance, and hence is liable to turn yellowish when it is heated to approx. 320° C. in an extruder. Further, since the activity is not reduced, particles of titanium dioxide often agglomerate. The formed agglomerates are liable to choke a wire strainer of 20 to 400 mesh (which is generally equipped at the end of the extruder so as not to extrude disturbing foreign material), and consequently they often increase the internal pressure in the extruder.

If the above-mentioned agents are coated on titanium dioxide for the inorganic surface treatment in an amount of more than 1.8 wt. %, water is liable to attach to the treated surface, and consequently the die lip stain remarkably grows and the formed film often has cracks. For this reason, generally it is not preferred to incorporate the titanium dioxide treated with such agents into the extruded resin composition in an amount of more than 20 wt. %.

In combination with dispersant aids (e.g., metal salt of higher fatty acids, ethyl ether of higher fatty acids, amide of higher fatty acids, higher fatty acids, and polyolefin waxes), titanium dioxide is dispersed in the polyolefin resin, and then mixed and kneaded by means of a mixing machine (e.g., twin-roll mill, three-roll mill, kneader, Banbury mixer, contentious kneading machine). As the dispersant aids, a metal salt of stearic acid (particularly, zinc stearate) is preferably used.

The contents of titanium dioxide and the dispersant aids in the kneaded mixture are preferably in the ranges of 30 to 75 wt. % and 2 to 10 wt. %, respectively. If the content of titanium dioxide is less than 30 wt. %, very bulky pellets are sometimes formed. On the other hand, if the content is more than 75 wt. %, the titanium dioxide particles are less dispersed and the pellets are liable to have cracks.

Figure 3:
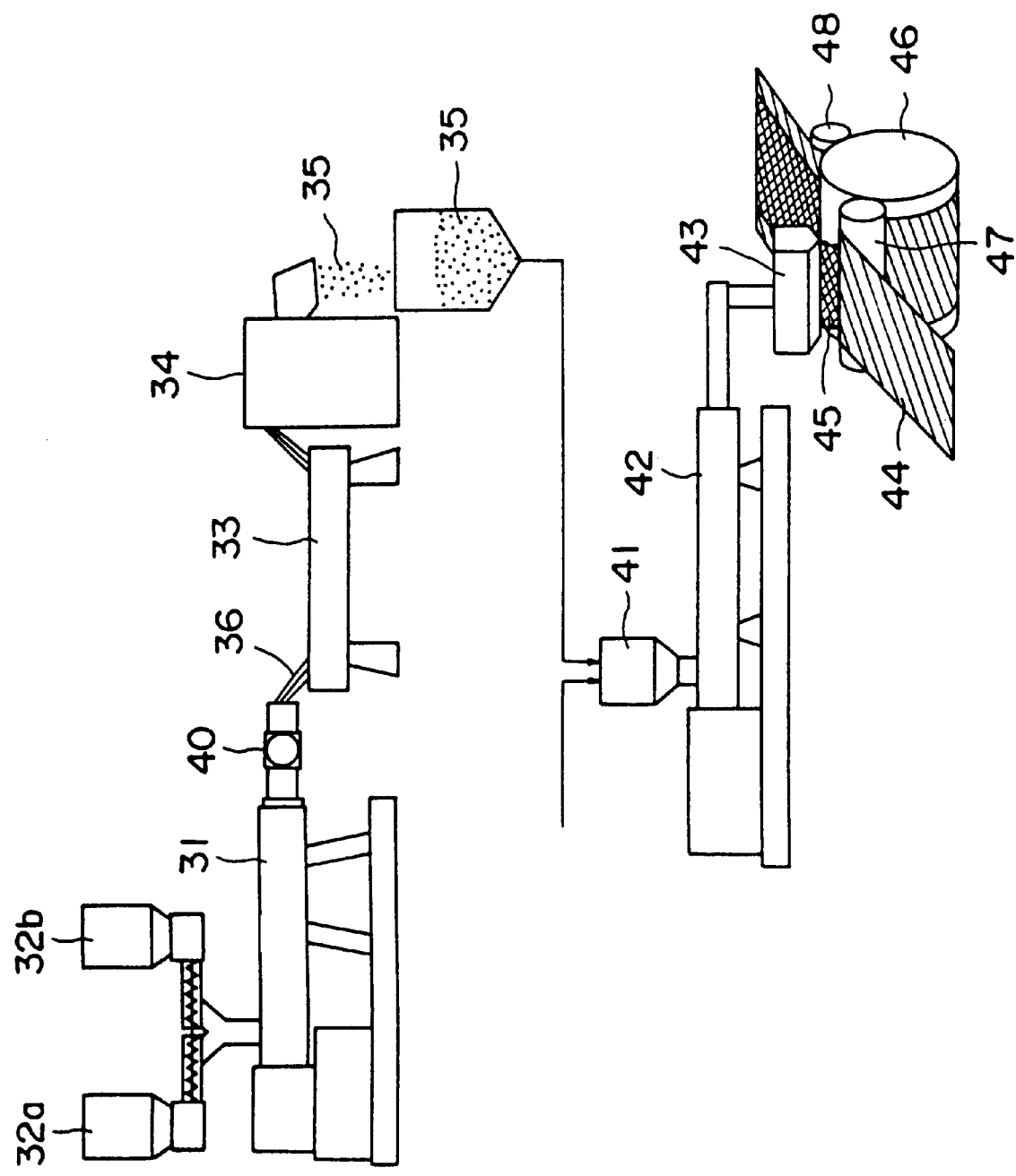
FIG. 3 shows a schematic view of a system for performing the process of the invention.

By referring to FIG. 3, an example of the process of the invention is described below in detail.

The process comprises the steps of: preparing polyolefin resin pellets containing titanium dioxide in a high concentration, mixing the pellets and a polyolefin resin to prepare a diluted mixture within 25 minutes after preparing the pellets, and extruding the diluted mixture to give a titanium dioxide-containing polyolefin resin layer.

A polyolefin resin and titanium dioxide are introduced into weight feeders 32a and 32b, respectively. Subsequently, predetermined amounts of polyolefin resin and titanium dioxide are continuously introduced into the kneader 31, and then mixed and kneaded under heating to give a kneaded mixture (titanium dioxide-containing polyolefin resin). The kneaded mixture is filtered on screen changer 40 to remove disturbing foreign material and to be processed to give strands 36, and then introduced into water tank 33 to place it in water. The strands of the mixture are pulled out of water, and then cut to give pellets with cutter 34. At the same time, the pellets are dried in the cutter 34 to give the master pellets 35. In the above steps, the pellets are prepared by strand-cut method. However, the under water-cut method (in which the pellets are prepared in water) and the hot-cut method (in which the pellets are prepared in air) are also utilizable.

The master pellets 35 and a polyolefin resin are supplied into extruder 42 from hopper 41 in a predetermined ratio, and then mixed and kneaded under heating. The resulting mixture is supplied into slit die 43, and then extruded from die lip of the slit die 43 to form film 45 which is coated on support (such as paper sheet) 44, for instance, within 25 minutes after the master pellets are prepared (and within 30 minutes after the kneaded mixture is obtained). Between chill roll 46 and pressure roll 47, the film 45 is fixed on the support sheet 44 to give a resin-coated support sheet which is favorably employed for producing a image recording sheet. Thus prepared resin-coated support is then transferred to the next step by means of roller 48.

As the kneader 31, a continuous internal mixing machine (twin screw kneader) such as a twin screw extruder (e.g., a full-engaged twin screw extruder), a single screw extruder, a planetary screw extruder and a Banbury mixer is generally employed. Particularly preferred is a continuous Banbury mixer. The kneading step is generally carried out at a temperature of 100 to 200° C. for 3 to 30 minutes. During the extrusion, the temperature at the die lip is generally kept at 170 to 345° C., preferably 250 to 345° C. The paper sheet may be coated by continuous method, and further the lamination methods using single or multi-laminating extrusion dies of feet block type, multi-manifold type and multi-slot type are also employable.

Within 30 minutes after preparing the kneaded mixture of the polyolefin resin containing titanium dioxide in a high concentration (and within 25 minutes after preparing the master pellets), the master pellets and a polyolefin resin are mixed and kneaded under heating to form a diluted mixture for preparing the desired polyolefin resin layer. This means that the polyolefin resin layer is formed while the water contained in titanium dioxide is kept inside. Therefore, cracks and lines caused by water in the titanium oxide are hardly produced on the surface of the resin layer prepared by the process of the present invention.

The kneaded mixture may be directly supplied into the extruder directly or in the form of other than pellets (e.g., sheet, pulverized powder). However, such processes are disadvantageous from the viewpoints of industrial production.

EXAMPLES

By referring to FIG. 3, the present invention is further described in the following non-restrictive working examples.

Example 1

40 Weight parts of low density polyethylene (melt index [MI]: 3.2 g/10 minutes) was introduced into the weight feeder 32a. Independently, 60 weight parts of titanium dioxide (mean particle size: 0.16 μm, anatase type, beforehand coated with 0.5 wt. % of alumina and 0.5 wt. % of triethanolethane) and 2.4 weight parts of zinc stearate were introduced into the weight feeder 32b. Subsequently, they were supplied into the continuous twin screw kneader 31, and then mixed and kneaded under the following conditions.

sizes of the twin screw kneader
  diameter of the screw: 59 mm,
  Length/Diameter: 30,
  rotation: 250 r.p.m.
  extruded amount: 200 kg/hour;
temperature for kneading: 150° C.
time for kneading: 5 minutes.

The kneaded titanium dioxide-containing polyethylene resin was filtered with the screen changer 40 to give strands of resin 36, and then the strands 36 were introduced into the water tank 33 to place them in water. After the strands 36 were pulled out of the water, they were cut into pellets (diameter: 3.5 mm, thickness: 4 mm) with the cutter 34. At the same time, the pellets were dried in the cutter 34 to give the master pellets 35. The period of time of from the end of the step of kneading to the time at which the master pellets were obtained was 3 minutes.

Immediately after the master pellets 35 were prepared, the pellets and the polyolefin resin were introduced into the single screw extruder 42 from the hopper 41 such manner that the content of titanium dioxide might be 15 wt. %, and then mixed and kneaded under heating. The resulting mixture was supplied to the slit die 43, and then extruded from the die lip of the slit die 43 to form the film 45 on the chill roll 46 (surface temperature: 20° C.). Between the chill roll 46 and the pressure roll 47, the film 45 is fixed on the support sheet (paper support) 44 to prepare a resin-coated support sheet. The mixing in the single screw extruder 42 was performed under the following conditions.

sizes of the extruder
  diameter of the screw: 59 mm
  Length/Diameter: 30
  rotation: 250 r.p.m.
  extruded amount: 200 kg/hour
temperature for mixing: 150° C.
temperature of the mixture at die lip (temperature for extruding): 325° C.
width of the extruded film: 500 mm.

Example 2

The procedures of Example 1 were repeated except that the pellets and the polyolefin resin were introduced into the single screw extruder 42 so that the content of titanium dioxide might be 25 wt. % instead of 15 wt. %, to prepare a resin-coated support sheet.

Example 3

The procedures of Example 1 were repeated except that the pellets and the polyolefin resin were introduced into the single screw extruder 42 so that the content of titanium dioxide might be 30 wt. % instead of 15 wt. %, to prepare a resin-coated support sheet.

Example 4

The procedures of Example 1 were repeated except that the period of time up to the step of introducing the pellets and the polyolefin resin into the single screw extruder 42 was prolonged to 10 minutes, to prepare a resin-coated support sheet.

Example 5

The procedures of Example 2 were repeated except that the period of time up to the step of introducing the pellets and the polyolefin resin into the single screw extruder 42 was prolonged to 10 minutes, to prepare a resin-coated support sheet.

Example 6

The procedures of Example 3 were repeated except that the period of time up to the step of introducing the pellets and the polyolefin resin into the single screw extruder 42 was prolonged to 10 minutes, to prepare a resin-coated support sheet.

Example 7

The procedures of Example 1 were repeated except that the period of time up to the step of introducing the pellets and the polyolefin resin into the single screw extruder 42 was prolonged to 20 minutes, to prepare a resin-coated support sheet.

Example 8

The procedures of Example 2 were repeated except that the period of time up to the step of introducing the pellets and the polyolefin resin into the single screw extruder 42 was prolonged to 20 minutes, to prepare a resin-coated support sheet.

Example 9

The procedures of Example 3 were repeated except that the period of time up to the step of introducing the pellets and the polyolefin resin into the single screw extruder 42 was prolonged to 20 minutes, to prepare a resin-coated support sheet.

Comparison Example 1

The procedures of Example 1 were repeated except that the period of time up to the step of introducing the pellets and the polyolefin resin into the single screw extruder 42 was prolonged to 45 minutes, to prepare a resin-coated support sheet.

Comparison Example 2

The procedures of Example 2 were repeated except that the period of time up to the step of introducing the pellets and the polyolefin resin into the single screw extruder 42 was prolonged to 45 minutes, to prepare a resin-coated support sheet.

Comparison Example 3

The procedures of Example 3 were repeated except that the period of time up to the step of introducing the pellets and the polyolefin resin into the single screw extruder 42 was prolonged to 45 minutes, to prepare a resin-coated support sheet.

Comparison Example 4

The procedures of Example 1 were repeated except that the period of time up to the step of introducing the pellets and the polyolefin resin into the single screw extruder 42 was prolonged to 180 minutes, to prepare a resin-coated support sheet.

Comparison Example 5

The procedures of Example 2 were repeated except that the period of time up to the step of introducing the pellets and the polyolefin resin into the single screw extruder 42 was prolonged to 180 minutes, to prepare a resin-coated support sheet.

[Evaluation of Manufacturing Process of Resin-Coated Support Sheet]

The resin-coated support sheets prepared above were evaluated from the following viewpoints.

(1) Lines carved by wastes attached to die lip

Lines appearing on the surface of each resin-coated support were observed with eyes to classify the resin-coated layer into the following grades:

AA: no line was observed

BB: few lines were observed

CC: some lines were observed

DD: a considerable number of lines were observed.

(2) Cracks

Cracks appearing on the surface of each resin-coated support were observed with eyes to classify the resin-coated layer the following grades:

AA: no crack was observed

BB: few cracks were observed

CC: some cracks were observed

DD: a considerable number of cracks were observed.

The results are set forth in Table 1.

TABLE 1

|        | $TiO_2$ (wt. %) | Period of time (minutes) | lines | cracks |
|--------|-----------------|--------------------------|-------|--------|
| Ex.1   | 15              | 3                        | AA    | AA     |
| Ex.2   | 25              | 3                        | AA    | AA     |
| Ex.3   | 30              | 3                        | AA    | AA     |
| Ex.4   | 15              | 10                       | AA    | AA     |
| Ex.5   | 25              | 10                       | BB    | AA     |
| Ex.6   | 30              | 10                       | BB    | BB     |
| Ex.7   | 15              | 20                       | BB    | BB     |
| Ex.8   | 25              | 20                       | BB    | BB     |
| Ex.9   | 30              | 20                       | CC    | BB     |
| C.Ex.1 | 15              | 45                       | BB    | BB     |
| C.Ex.2 | 25              | 45                       | DD    | DD     |
| C.Ex.3 | 30              | 45                       | DD    | DD     |
| C.Ex.4 | 15              | 180                      | BB    | BB     |
| C.Ex.5 | 25              | 180                      | DD    | DD     |

What is claimed is:

1. A process for preparing a resin-coated support which comprises the steps of mixing and kneading a polyolefin resin with titanium dioxide having no hydrophobic compound on its surface under heating to obtain a kneaded mixture containing the titanium dioxide in an amount of 20 to 70 weight %, cooling the kneaded mixture, treating the cooled mixture to give pellets, mixing and kneading the pellets with a polyolefin resin under heating to give a diluted mixture, extruding the diluted mixture through a slit of an extruder die, and coating the extruded mixture on a support, wherein the mixing and kneading step for giving the diluted mixture starts within 30 minutes after the kneaded mixture is obtained.

2. The process of claim 1, wherein the step for giving the diluted mixture starts within 25 minutes after the kneaded mixture is obtained.

3. The process of claim 1, wherein the step for giving the diluted mixture starts within 15 minutes after the kneaded mixture is obtained.

4. The process of claim 1, wherein the step for giving the diluted mixture starts within 25 minutes after the pellets are is obtained.

5. The process of claim 1, wherein the polyolefin resin is a polyethylene resin.

6. The process of claim 1, wherein the support sheet is a paper sheet.

* * * * *